US008990229B2

(12) United States Patent
Lafoucriere et al.

(10) Patent No.: US 8,990,229 B2
(45) Date of Patent: Mar. 24, 2015

(54) METHOD FOR SUPPLYING A MULTIMEDIA CONTENT PROXY, PROXY, AND CORRESPONDING COMPUTER SOFTWARE PRODUCT

(75) Inventors: Philippe Lafoucriere, Roberval (FR); Vincent Dupain, Le Meux (FR); Benoît Cantin, Venette (FR); Jean-Claude Dufourd, Le Kremlin Bicetre (FR)

(73) Assignee: Streamezzo, Paris (FR)

( * ) Notice: Subject to any disclaimer, the term of this patent is extended or adjusted under 35 U.S.C. 154(b) by 264 days.

(21) Appl. No.: 12/864,659

(22) PCT Filed: Jan. 23, 2009

(86) PCT No.: PCT/EP2009/050801
§ 371 (c)(1),
(2), (4) Date: Nov. 16, 2010

(87) PCT Pub. No.: WO2009/092809
PCT Pub. Date: Jul. 30, 2009

(65) Prior Publication Data
US 2011/0055235 A1    Mar. 3, 2011

(30) Foreign Application Priority Data
Jan. 24, 2008  (FR) ...................... 08 50451

(51) Int. Cl.
*G06F 7/00*      (2006.01)
*G06F 17/30*     (2006.01)

(52) U.S. Cl.
CPC ...... *G06F 17/3002* (2013.01); *G06F 17/30056* (2013.01); *G06F 17/30902* (2013.01); *Y10S 707/99933* (2013.01)

USPC .......... 707/758; 707/722; 707/733; 707/734; 707/803; 707/999.003

(58) Field of Classification Search
CPC .................... G06F 17/30029; G06F 17/30702; G06F 17/30761; G06F 17/30256; G06F 17/30017; G06F 17/30053; G06F 17/3087; G06F 17/30828; G06F 17/30855; G06F 17/3089; G06F 17/30997
USPC ........................................................ 707/758
See application file for complete search history.

(56) References Cited

U.S. PATENT DOCUMENTS

| 6,289,358 B1 * | 9/2001 | Mattis et al. ................... 707/695 |
| 7,251,649 B2 * | 7/2007 | Shen et al. ..................... 711/113 |
| 7,613,815 B1 * | 11/2009 | Prakash et al. ................. 709/230 |
| 2002/0007392 A1 * | 1/2002 | Buddhikot et al. ........... 709/203 |

(Continued)

OTHER PUBLICATIONS

Schojer et al., Architecture of a Quality Based Intelligent Proxy for MPEG-4 Videos, WWW2003, May 20-24, 2003, Budapest, Hungary, ACM, pp. 394-402.*

(Continued)

*Primary Examiner* — Azam Cheema
(74) *Attorney, Agent, or Firm* — Zilka-Kotab, PC (57) ABSTRACT

The invention relates to a method for supplying a multimedia content proxy. According to the invention, the method comprises: the step of receiving at least one instance of at least one model of a profiled multimedia scene adapted to a predetermined profile of users having at least one common parameter and from a loom server; the step of storing in said content proxy said at least one instance of said at least one model of profiled multimedia scene.

4 Claims, 4 Drawing Sheets

(56) References Cited

U.S. PATENT DOCUMENTS

| | | | |
|---|---|---|---|
| 2003/0041328 A1* | 2/2003 | Khoo et al. | 725/47 |
| 2004/0014469 A1 | 1/2004 | Lancieri | |
| 2004/0107434 A1* | 6/2004 | Khoo et al. | 725/25 |
| 2006/0168623 A1* | 7/2006 | Khoo et al. | 725/46 |
| 2007/0079327 A1* | 4/2007 | Khoo et al. | 725/35 |
| 2007/0198632 A1* | 8/2007 | Peart et al. | 709/203 |
| 2008/0163320 A1* | 7/2008 | Chen et al. | 725/112 |
| 2008/0163355 A1* | 7/2008 | Chu | 726/12 |

OTHER PUBLICATIONS

Architecture of a Quality Based Intelligent Proxy for MPEG-4 Videos, WWW2003, May 20-24, 2003, Budapest, Hungary, ACM.*

Schojer, Peter et al: "Architecture of a Quality Based Intelligent Proxy (QBIX) for MPEG-4 Videos," WWW2003, May 20-24, 2003, pp. 394-402.

Chen, Songqing et al: "SProxy: A Caching Infrastructure to Support Internet Streaming" IEEE Transactions on Multimedia vol. 9, Issue 5, Aug. 2007, pp. 1062-1072.

Fahmi, Husni et al: "Proxy Servers for Scalable Interactive Video Support," Computer, IEEE, Sep. 2001, pp. 54-60.

International Search Report from International Application No. PCT/EP2009/050801, dated May 20, 2009.

Written Opinion from International Application No. PCT/EP2009/050801, dated May 20, 2009.

Office Action from Chinese Patent Application No. 200980103254.3, dated Mar. 7, 2012.

Office Action from Chinese Patent Application No. 200980103254.3, dated Apr. 11, 2013.

Office Action from Chinese Patent Application No. 200980103254.3, dated Oct. 9, 2012.

* cited by examiner

METHOD FOR SUPPLYING A MULTIMEDIA CONTENT PROXY, PROXY, AND CORRESPONDING COMPUTER SOFTWARE PRODUCT

CLAIM for PRIORITY

The present application is a Section 371 National Stage Application of International Application No. PCT/EP2009/050801 filed Jan. 23, 2009 and claims the priority of French Patent Application filed Jan 24, 2008 under Application No. 0850451, which is incorporated herin by reference.

FIELD OF THE INVENTION

This invention relates to the field of composing multimedia scenes.

This invention relates more particularly to the personalised composition of multimedia scenes.

With the advent of elaborate and personalised multimedia content distribution technologies, complex content-providing architectures have emerged, such as "n-tier" architectures. "N-tier" architectures are based on the use of business servers, presentation servers and data base servers.

A business server is a server which enables the formulation of responses intended for a client who requests same, without this server being concerned with constructing a presentation of this response. A business server thus implements a service logic and describes the operations that the application must carry out with regard to the data base, via the data base server. A presentation server is responsible for formatting the response prior to forwarding same to the client. This formatting takes account of the client's restitution parameters.

PRIOR ART

Such "n-tier" architectures simultaneously induce response times which may be long, from the point of view of the client making the request, and high computing loads on the servers. Some architectures of the prior art therefore make use of content proxies. A content proxy is an intermediary in which content is stored which is likely to be re-used by one or more clients and the data of which comes from the business server. In other words, this is a cache manager which is responsible for recording the responses (in the form of multimedia scenes) already provided by the business server with a view to simultaneously reducing the time required for obtaining a response for the client and the computing loads on the server side.

Figure 1:
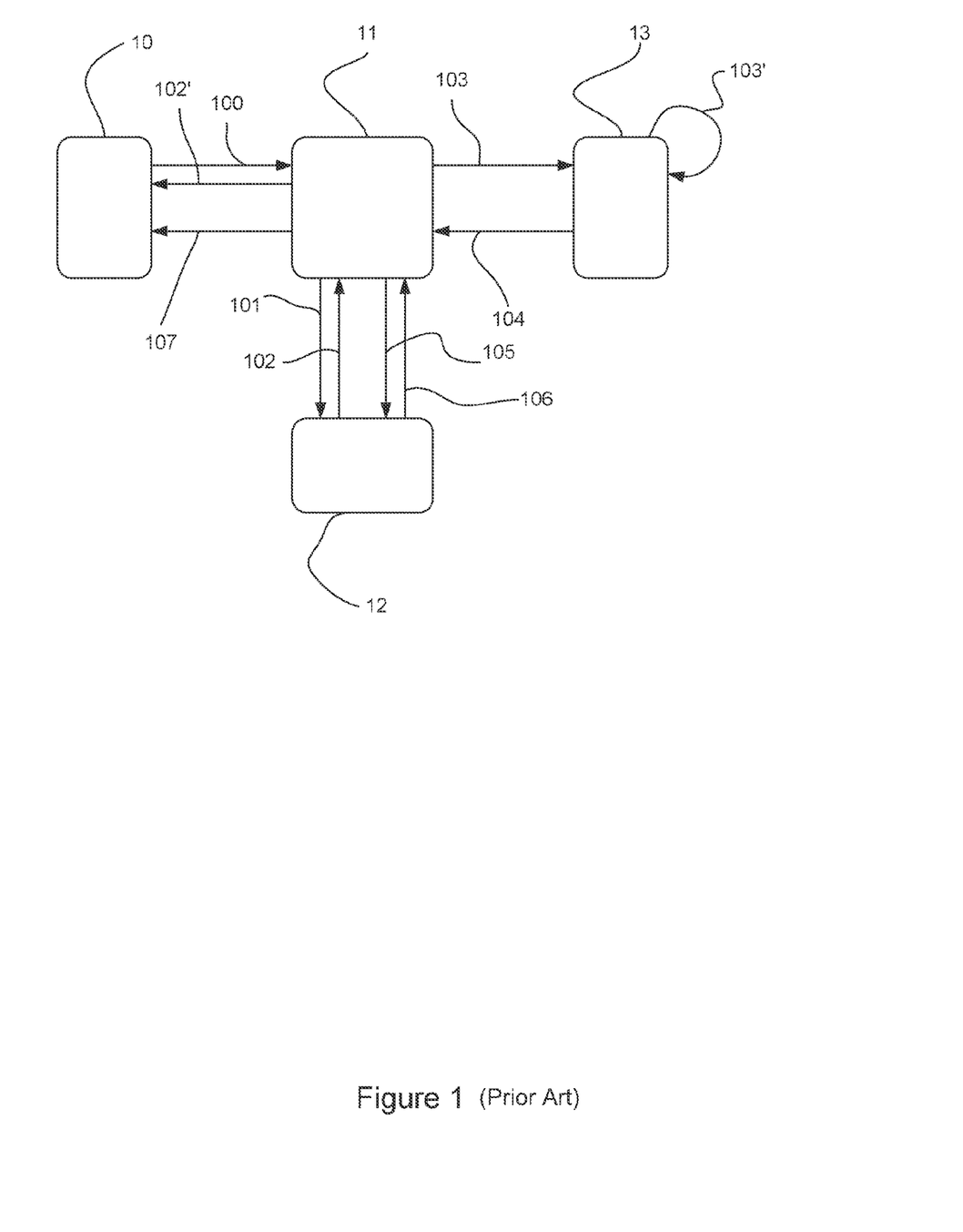
FIG. 1, which has already been introduced, is a block diagram describing the sequence of exchanges between a client, a presentation server, a business server and a content proxy according to the prior art.

A sequence of requests is shown in connection with FIG. 1, which results in the obtainment of a multimedia scene for a client 10 who requested same and wherein a content proxy 12 is used.

The client 10 issues 100 a request to the presentation server 11;

The presentation server 11, via the content proxy 12, searches 101 to see if the result of the request has already been generated;

The content proxy 12 returns 102 a result to the presentation server 11;

If the result of the request (the multimedia scene) has already been generated and saved in cache, it is then sent 102' to the client;

If the multimedia scene has not yet been generated or saved in cache, the presentation server 11 asks 103 the business server 13 to generate a result for the request;

The business server 13 computes 103' a result, based on the profile of the user who requested it and returns 104 it to the presentation server 11;

The presentation server 11 records 105 the result in the content proxy 12;

The presentation server 11 retrieves 106 the value that was just recorded and sends 107 the response to the client 10.

The management of a cache by means of a conventional content proxy therefore consists in preserving contents computed at the request of a client having made the request, for a specific period of time. If this request has not already been processed by the presentation server, then the business server computes the result for this request. This result is saved in the content proxy and sent to the client.

If the request has already been made, two hypothetical cases are possible:

either the result has expired; in this case it must be recomputed and the content proxy updated again;

or the result is still valid; in this case the response is immediately returned by the presentation server without passing through the business server.

This cache management technique of the prior art nevertheless has several disadvantages. As a matter of fact, saving of the computation result by the content proxy is only active for a specific time period or until the cache is full. This means that, at the end of a specific time period or when there is a shortage of space in the cache, the response will be deleted and the business server will be obligated to recompute the response at the next equivalent client request. This technique likewise has the disadvantage of not allowing clients with different profiles from taking advantage of the results that are already present in the content proxy. As a matter of fact, the distribution of elaborate and personalised multimedia content passes by way of the user profile analysis so as to enable personalisation by inserting profilable content. Profilable content is content which can be integrated into a multimedia scene based on a user profile. Such profilable content, for example, can be a promotion or an advertisement, e.g., commercial messages. Such being the case, a first client who wishes to access a certain content (e.g., a trailer), and who has a first profile, will not necessarily obtain an identical response to that of a second client having a second profile, whereby the response to the request of the first client saved in the content proxy may not necessarily be able to be reused for the second client, even though the content originally requested is the same (the trailer). In other words, this cache management technique of the prior art does not guarantee reuse of the responses stored within the content proxy.

SUMMARY OF THE INVENTION

The solution proposed by the invention does not have these disadvantages of the prior art. As a matter of fact, it relates to a method for supplying a multimedia content proxy.

According to the invention, such a method comprises:

a step of receiving at least one instance of at least one model of a profiled multimedia scene, adapted to a predetermined profile of users having at least one common parameter originating with a business server;

a step of storing, within said content proxy, said at least one instance of said at least one profiled multimedia scene.

Thus, unlike the techniques of the prior art for which multimedia scenes are cached within the content proxy after complex and full computation by the business server, the invention makes do with storing instances of models of multimedia scenes that have been pre-computed within the content proxy. These model instances, which can be seen as a portion of the multimedia scene originating with the business server, are easier to compute and are stored prior to receiving a request from a user terminal. In other words, according to the invention, the system pre-computes all of the options of all of the dependent portions of the client profile, within the scene which will comprise the response to the client request. This pre-computation enables a minimal response time to be guaranteed at the moment of the request.

Another advantage of the invention is that the pre-computation of all of the options of all of the variable portions of a scene not only guarantees a better response time, but also improved regularity in the computing time for the response.

According to one particular embodiment of the invention, prior to said receiving step, said supply method comprises:

a step of verifying availability of at least one profilable multimedia content, issuing a list of profilable multimedia contents;

at least one step of creating said at least one model of a profiled multimedia scene integrating at least one of said profilable multimedia scene contents from said list;

a step of creating a multidimensional data structure enabling at least one model of a profiled multimedia scene to be associated with at least one user profile parameter;

a step of transmitting at least one model of a profiled multimedia scene to a presentation server;

a step of transmitting, via said presentation server, said at least one model of a profiled multimedia scene to said multimedia content proxy.

Thus, unlike the techniques of the prior art in which the presentation server makes a request to the business server to obtain a multimedia scene, the method of the invention, and in some cases without any request by the presentation server, creates models of multimedia scenes based on profilable contents at its disposal. As already stated, profilable content is content which can be integrated into a multimedia scene based on a user profile. Such profilable content, for example, can be a promotion or an advertisement. The models of profiled multimedia scenes are thus constructed in advance according to the profilable contents available to the business server, and then transmitted, at the initiative of this same business server, to the presentation server. This presentation server next transmits the models to the multimedia content proxy. Such a two-step transmission operation cleverly makes it possible to not have to construct new "n-tier" architectures and to not have to define new interactions between the servers. Upon receiving a response from the business server; the conventional process requires the presentation server to store this response in the content proxy. The method of the invention uses this conventional operation, not to store a response to a request from the presentation server, but to store a model, optionally constructed at the initiative of the business server.

According to another particular characteristic of the invention, said supply method further comprises a step of constructing a multidimensional data structure enabling at least one instance of a profiled multimedia scene model to be associated with at least one user profile parameter.

The invention thus makes it possible to know in advance the instance of a model of a profiled multimedia scene which will be used to provide the multimedia scene to the user upon the request thereof. This instance of a model will be chosen, within the multidimensional data structure, by analysis of the parameters which make up the user profile. According to one particular embodiment of the invention, the user's profile can be transmitted within the request for obtaining the multimedia scene. According to another particular embodiment of the invention, the user's profile can be accessible directly from the business server or from the presentation server by way of a database server. According to another particular embodiment of the invention, the two preceding techniques can be combined.

According to another aspect, the invention likewise relates to a computer program product downloadable from a communication network and/or stored on a machine-readable medium and/or executable by a microprocessor, and including program code instructions for executing the supply method as described above.

The invention likewise relates to a multimedia content proxy. According to the invention, such a proxy comprises:

means of receiving at least one instance of at least one model of a profiled multimedia scene, adapted to a predetermined profile of users having at least one common parameter and originating with a business server;

means of storing said at least one instance of said at least one model of a profiled multimedia scene within said content proxy.

According to another aspect, the invention likewise relates to a method of constructing a multimedia scene based on a request from a user terminal.

According to the invention, such a method comprises:

a step of determining a profile for said user;

a step of obtaining, based on said profile, at least one instance of a profiled multimedia scene model previously stored by a multimedia content proxy;

a step of aggregating, within said, instance, at least one multimedia data item corresponding to at least one parameter of said request.

The invention thus makes it possible to solve the performance problems with respect to the client and the load-related problems with the servers subjected to multiple requests. As a matter of fact, according to the invention, the use of an existing instance of a multimedia scene model enables protective measures to be taken against problems related to the expiration dates of the computation results of the methods of the prior art. In other words, the construction of a result (of a multimedia scene) is, according to the invention, based on the use of portions of scenes that have been pre-computed by the business server and stored within the content proxy. The portion or portions of pre-computed scenes which are used to produce the multimedia scene are linked to the user's profile in order to enable personalisation of the result. As for the aggregation, it enables the construction of the multimedia scene to be completed by inserting therein the content initially requested by the user.

According to one particular embodiment of the invention, said obtainment step comprises a step of searching for an instance of a profiled multimedia scene model using a multidimensional data structure enabling at least one profiled multimedia scene model to be associated with at least one user profile parameter.

According to another aspect, the invention likewise relates to a computer program product downloadable from a communication network and/or stored on a machine-readable medium and/or executable by a microprocessor, and including program code instructions for executing the construction method as described above.

The invention likewise relates to a multimedia scene model.

According to the invention, such a model comprises:

at least one profiled multimedia content, adapted to a predetermined profile of users having at least one common parameter;

at least one location for inserting a variable multimedia content.

The invention also relates to a business server.

According to the invention, such a business server comprises:
- means of verifying availability of at least one profilable multimedia content, issuing a list of profilable multimedia contents;
- means of creating at least one model of a profiled multimedia scene, adapted to a predetermined profile of users having at least one common parameter, and integrating at least one of said profilable multimedia contents from said list;
- means of creating a multidimensional data structure enabling at least one model of a profiled multimedia scene to be associated with at least one user Profile parameter;
- means of transmitting at least one model of a profiled multimedia scene to a presentation server.

According to another aspect, the invention also relates to a system for providing a multimedia scene of the "Rich Media" type.

According to the invention, the system comprises:
- a presentation server;
- a multimedia content proxy;
- a business server, cooperating such that, within said content proxy, said presentation server carries out a predictive search for at least one instance of a model corresponding to a user profile, said search being carried out amongst a plurality of instances of models that have been pre-computed by a business server so as to improve said multimedia scene-creation performance.

LIST OF FIGURES

Other, characteristics and advantages of the invention will become more apparent upon reading the following description of a preferred embodiment, given for merely illustrative and non-limiting purposes, and from the appended drawings, in which.

DETAILED DESCRIPTION OF THE INVENTION

1. Recall of the Principle of the Invention

The invention therefore makes it possible to regulate the load of the business servers and the presentation servers while at the same time ensuring optimal use of the data cached in the content proxy. As a matter of fact, only data with a high probability of being used is cached in the proxy. This data corresponds to instances of profiled multimedia scene models which form an integral part of this invention. In this way, rather than caching data which is useless since it has little chance of being reused, the invention makes it possible to store useful data which can be mandatorily reused, even if two users make requests for obtaining different contents.

As a matter of fact, according to the invention, it is not the entire multimedia scene that is stored in the content proxy, but rather instances of profiled models, i.e., adapted to a predetermined profile of users having at least one common parameter. These instances of models contain at least one "empty" space enabling the content to be received as is (which, for example, may be text, an image or a video).

According to another aspect of the invention, rather than waiting for the presentation server to issue an obtainment request to the business server, the invention enables the instances of a model to be stored in the content proxy at the initiative of the business server. This means that the business server waits for the provision of profilable content (i.e., the content which can be profiled), which can be provided in continuously, in order to integrate same into one or more instances of models. The instances of models are therefore "pre-computed" by the business server, based on the available profitable content, in order to improve the creation performance of the future multimedia scenes.

Conventional content management does not include any notion of a model, because the result is final. This is not the case with the invention. And this aspect of a model ensures both the reusability of the cached data and the reduction in the processing load of the servers.

In other words, the content proxy can be pre-filled with pre-computed models. Unlike a conventional cache system:
- the proxy is not supplied upon request by the client, but is supplied by the business server;
- the final result of the client request is not stored in the content proxy. It is an intermediate result intended to be completed which is stored: it is an instance of a response model.

The advantages of this approach in particular are that:
- the content proxy will not search for the data on the business server. It is the business server which "pushes" the content into the proxy; in an alternative, the business server sends the data to the presentation server which manages the relationship with the proxy; in another alternative, the presentation server does the management work and controls the process by generating pseudo client requests in order to query the business server and cause it to pre-compute the models;
- the receiving of a client request does not involve "voluminous" processing by the business server, hence a performance gain for the client. The only requests processed in real time at the request of the client are those having to do with external resources (RSS-type resources, the addition of an image or the addition of a video) which are specific to a request and could not be optimised by caching.
- a fortiori, the first client requests do not require the proxy to be filled.

Figure 2:
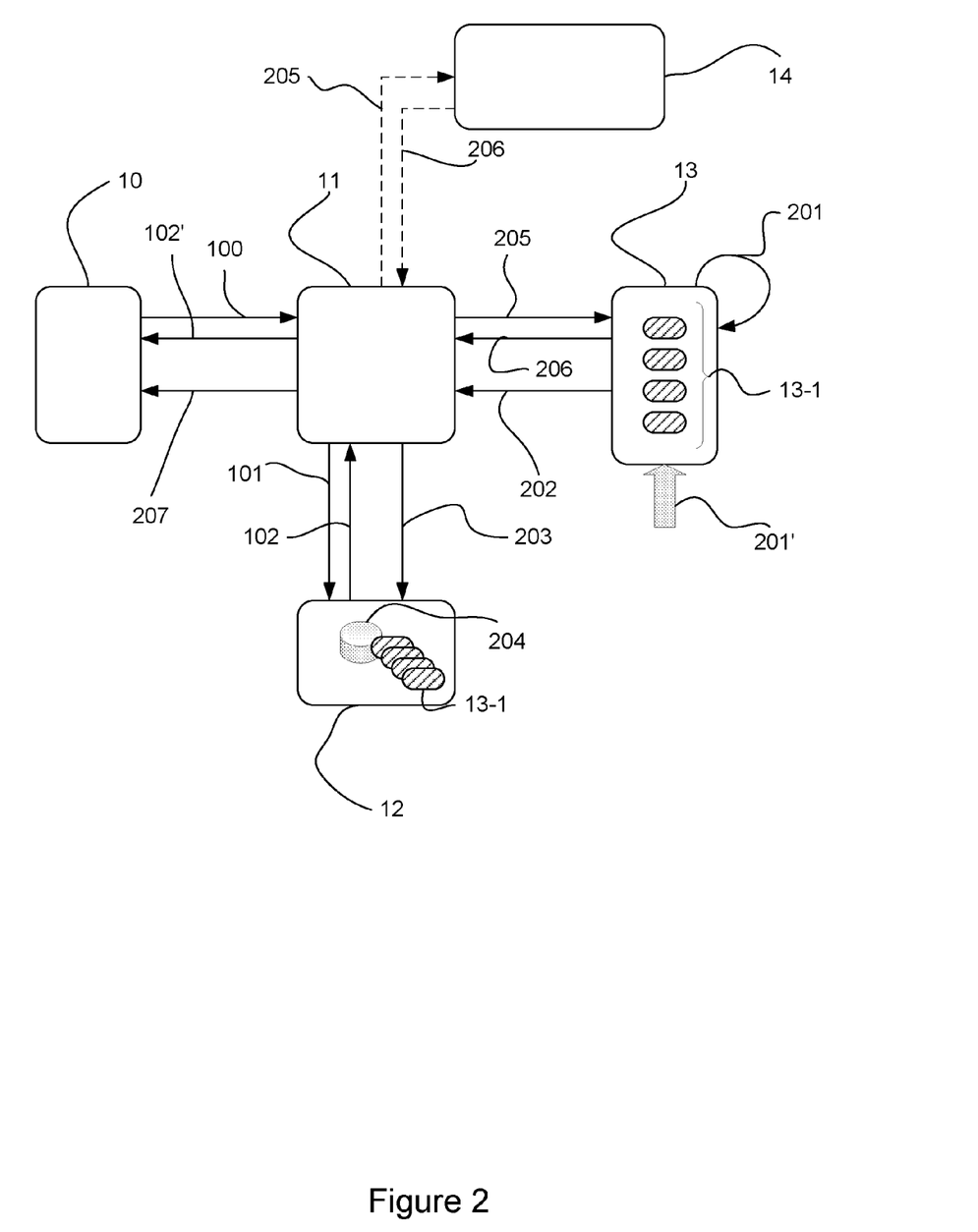
FIG. 2 shows a block diagram describing the sequence of exchanges between a client, a presentation server, a business server and a content proxy according to the invention.

An exemplary embodiment of the method of the invention is introduced in connection with FIG. 2, in the form of a sequence of requests resulting in the obtainment of a multimedia scene for a client 10 who requested same and in which a content proxy 12 according to the invention and instances of scene models according to the invention are used. The numerical references shared with FIG. 1 have been retained for greater clarity.
- the business server 13 constructs 201 the instances of multimedia scene models 13-1 and transmits 202 them to the content proxy 12 by means of the presentation server 11. This construction is made by the business server continuously, i.e., while obtaining 201' profilable contents capable of being the subject of a scene model; the business server 13 constructs 201 the instances of scene models.

the content proxy 12 receives 203 these model instances and records 204 same. The proxy therefore contains the models required for responding to all of the requests from clients.

the client 10, having a profile, issues 100 a request to the presentation server 11;

the presentation server 11, via the content proxy 12, searches 101 for the instance of a model 13-1 which is suited to a response (such an instance is always present insofar as the creation of the model instances takes account of the profilable parameters of the clients who make the requests), based on the profile parameters of the client 10;

the content proxy 12 returns 102 a result to the presentation server 11;

If the model instance is not entirely developed, the presentation server 11 calls upon 205 the business server 13 or an external source 14 to complete it (with a video, a text or an image, for example);

the presentation server 11 receives 206 the response (i.e., the missing content) from the business server 13 or from the other source 14.

the presentation server 10 returns 207 the complete multimedia scene (i.e., corresponding to the model instance 13-1 to which the missing content has been added) to the client 10.

The search 101 within the content proxy is therefore predictive due to the presence of the instances of pre-computed models. The system of the invention therefore makes it possible to always have at least one model instance which has been computed in order to respond to the profile of the user who made the request. In this way, the presentation server, multimedia content proxy and business server cooperate within the system, such that, within the content proxy, the presentation server carried out a predictive search for a model instance corresponding to the user's profile, the search being carried out amongst the instances of models that have been pre-computed by the business server so as to improve the multimedia scene-creation performance.

The particular case wherein the method of the invention is implemented as applied to targeted advertising is introduced hereinbelow. However, it is clear that the invention is not limited to this particular application, but can likewise be implemented in numerous other hypothetical cases where at least a portion of a piece of information to be transmitted to a client following a request is determined on the basis of a profile for this client.

2. Descriptions of Implementing Instances of Models

2.1 FIRST EXAMPLE

The business server is capable of managing multimedia scenes, advertising content and profiles.

Figure 3A:
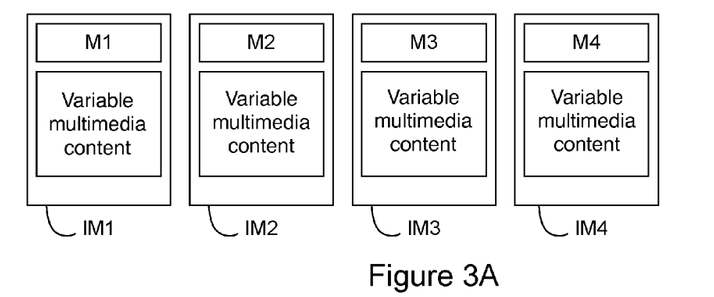
FIGS. 3A, 3B and 3C are schematic representations of the instances of a multimedia scene model.

That is, the following set of initial data:
a multimedia scene containing the following elements:
an advertising banner;
a text derived from an RSS stream;
four advertising banners, which assume a position at the top of the scene, the descriptions of which are as follows:
advertisement 1 for the mark M1;
advertisement 2 for the mark M2;
advertisement 3 for the mark M3;
advertisement 4 for the mark M4.
an RSS stream, corresponding to a variable multimedia content (CMMV);
two profiles:
a male profile associated with advertisements 1 and 2;
a female profile associated with advertisement 3;

The business server must therefore generate four instances of models which are shown in FIG. 3A (IM1, IM2, IM3, IM4).

The restrictions of the instances of models per profile, in a table (two-dimensional), yields the following result:
models IM1, IM2, and IM4 for the male profile;
models IM3 and IM4 for the female profile.

2.2 SECOND EXAMPLE

The preceding set of initial data is taken up again, to which two new profiles are added:
an over-30 profile added to the advertisement 2 for the mark M2;
an under-30 profile added to the advertisement 1 for the mark M1.

The business server must therefore generate the same four models as in the preceding example.

However, the restriction of the models corresponding to the profiles in the correlation table is finer:
Models 2 and 4 for the male profile/over-30;
Models 1 and 4 for the male profile/under-30;
Models 3 and 4 for the female profile.

2.3 THIRD EXAMPLE

The preceding set of initial data is taken up again to which a fifth profilable content is added, an advertisement 5 for the mark M5.

Figure 3B:
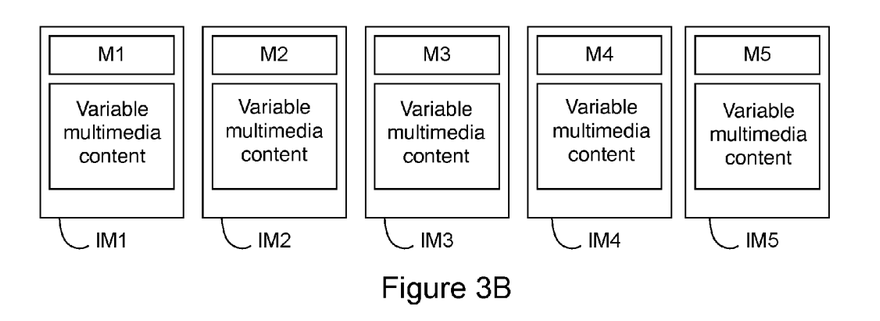

The business server must therefore generate five instances of models each including a different advertisement, as shown in FIG. 3B.

The restriction of the models corresponding to the profiles is as follows:
Models 2, 4 and 5 for the male profile/over-30;
Models 1, 4 and 5 for the male profile/under-30;
Models 3, 4 and 5 for the female profile.

2.4 FOURTH EXAMPLE

The preceding set of initial data is taken up again to which the following modifications are made:
a multimedia scene contains the following elements:
an advertising banner containing localised text;
a text derived from an RSS stream (this is therefore the variable content requested by the CMMV client);
a fixed text which is localised (based on a language: TXT FR into TXT EN);
two possible localisations:
a localisation "FR" for francophones;
a localisation "EN" for Anglophones;
Each advertisement therefore has two versions:
a localised FR version;
a localised EN version.

Figure 3C:
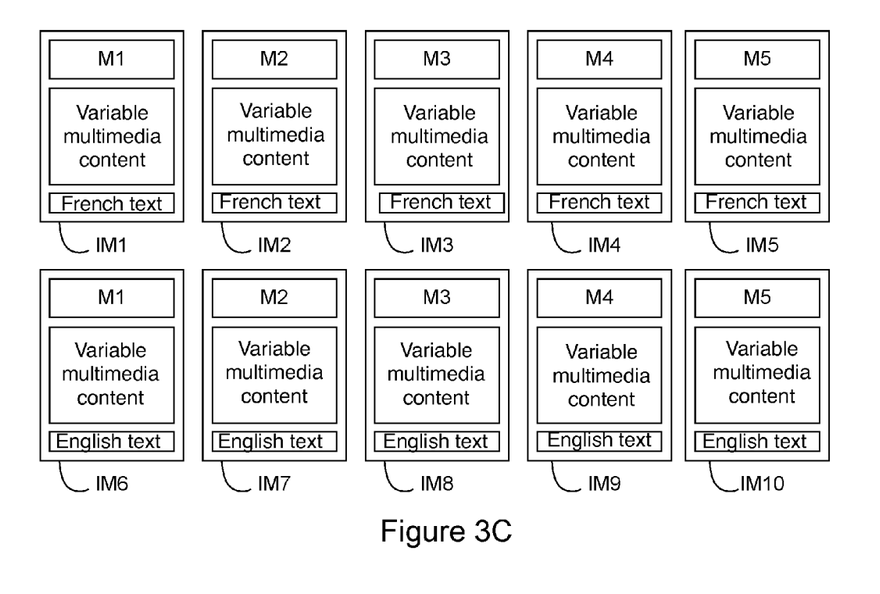

The business server must therefore generate ten instances of models corresponding to the advertisements in English and the advertisements in French. In this example, it is considered that the localised text has only an English version and a French version, as shown in FIG. 3C.

In order to make it easier to understand, the structure corresponding to the profiling of the instances of models based on the profile parameters, which, in reality, is multidimensional, is presented in the form of a two-dimensional table.

The restriction of the instances of models corresponding to the profiles is as follows:

|        | −30 yrs/FR | +30 yrs/FR | −30 yrs/EN | +30 yrs/EN |
|--------|------------|------------|------------|------------|
| Female | 3, 4, 5    | 3, 4, 5    | 8, 9, 10   | 8, 9, 10   |
| Male   | 2, 4, 5    | 1, 4, 5    | 7, 9, 10   | 6, 9, 10   |

Then total number of instances of models to be generated is the Cartesian product of the variable number (in this example, two variables are used: there are five advertisements and two localizations).

As concerns the profiles, they do not generate complexity. In contrast, they enable a restriction to be made on the content proxy with regard to the choice of instances of models. In order to make this choice, the presentation server must be in possession of the multidimensional structure for restricting the instances, which is provided by the business server based on the number and type of profilable contents that it receives.

3. Other Optional Characteristics and Advantages 3.1 With an Event-Driven System As already stated, the business server can update the content proxy with new instances of models of scenes as soon as one of the sources thereof is modified (a profilable content is added or a profilable content is modified). The advantage of this system is that the proxy is always up-to-date, depending, of course, on the computing time for the instances of the models. The notion of any expiration of the cache data disappears.

If, for example, a new advertising content is added to the business server and if this advertising content is or is not associated with a "male/female" profile. In this case, new model instances containing a reference for this advertisement must be added to the content proxy.

Another example can be that of modifying the text of a multimedia scene on the business server. In this case, all of the model instances of this multimedia scene must be updated.

In this way, in this embodiment, updating of the content proxy by the business server is carried out when an event occurs. This event (addition, modification, deletion of profilable content) therefore causes the content proxy to be updated.

3.2 With an Ordering System

In another embodiment, the business server can update the content proxy at regular intervals. The advantage of this ordering system is that the processing date is specific and not random. The preceding example remains valid.

3.3 With the Running of a Parameter Identifying the Profile in the Client Request According to an additional embodiment of the invention, the system performance is improved by inserting a specific parameter into the requests originating with the clients. This parameter enables the client's profile to be identified. In this way, the search for the model corresponding to the request is done in a subset of the proxy content, thereby enabling this search to be accelerated, in comparison with a conventional system in which all of the parameters comprising the profile must be used in order to determine the content of the multimedia scene.

In this way, by taking up the last example introduced, and when the request originating with the client terminal comprises the identifier of the profile of a "male who is under 30 years old and who is French," then the search for the corresponding models in the multidimensional data structure is carried out directly on the subset (Model 2, Model 3, Model 4). The performance is thus improved.

4. Physical Architecture of a Business Server

Figure 4:
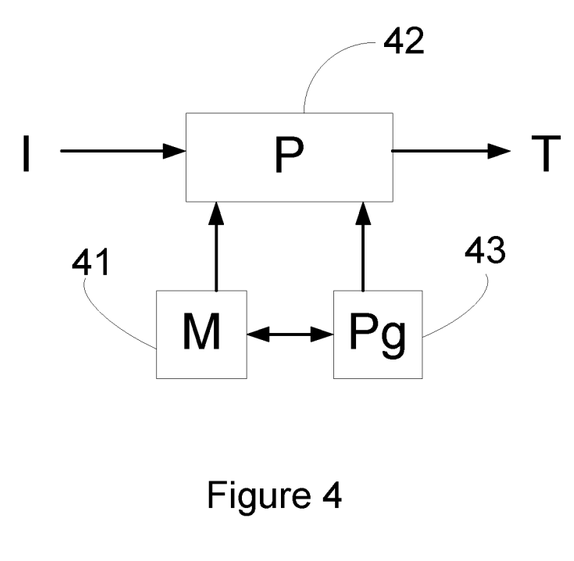
FIG. 4 is a schematic representation of a business server according to the invention.

An embodiment of a business server according to the invention is shown in connection with FIG. 4.

Such a server comprises a memory 41 consisting of a buffer memory, a processing unit 42 equipped with a microprocessor P and controlled by the computer program 43, which implements the construction method according to the invention.

Upon initialization, the computer program 43 code instructions, for example, are loaded into the RAM memory prior to being executed by the processor of the processing unit 42. The processing unit 42 is inputted with at least one profilable multimedia content. The processor of the processing unit 43 implements the steps of the previously described management method, according to the instructions of the computer program 43, in order to create instances of models of multimedia scenes. To accomplish this, besides the buffer memory 41, the server comprises means of characterizing the profilable contents based on profile parameters, and means of transmitting the instances of models to a presentation server or to a content proxy. These means are controlled by the processor of the processing unit 42.

In one embodiment (not shown), the content proxy can have a similar physical structure.

The invention claimed is:

1. A method, comprising:
   prior to receiving a request from a user for a profiled multimedia scene, receiving from a business server at least one instance of at least one model of said profiled multimedia scene for avoiding retrieval of any portion of said multimedia scene from said business server in response to said request from said user;
   determining a profile for said user, said at least one instance of said at least one model of said profiled multimedia scene adapted to a predetermined profile of users having at least one common demographic parameter by integrating in a portion of a multimedia scene profilable content predetermined for said predetermined profile of users having said at least one common demographic parameter, and said at least one instance of said at least one model of said profiled multimedia scene originating with said business server that pre-computes a different instance of said at least one model of said profiled multimedia scene for each different predetermined profile of users such that each instance of said at least one model of said profiled multimedia scene is adapted to a particular predetermined profile of users by integrating in said portion of said multimedia scene different profilable content predetermined for the particular predetermined profile of users;
   obtaining, based on said profile, said at least one instance of said profiled multimedia scene model previously stored by a multimedia content proxy, where said obtaining comprises searching for an instance of a profiled multimedia scene model using a multidimensional data structure enabling at least one profiled multimedia scene model to be associated with at least one user profile parameter, including searching a plurality of instances of models that have been pre-computed, prior to receiving said request from said user, by said business server; and
   aggregating, within said at least one instance, at least one multimedia data item corresponding to at least one parameter of a request from a terminal of said user;
   wherein said business server is separate from said content proxy;
   wherein updating said content proxy in response to a client request is avoided by updating said at least one instance of said at least one model of said profiled multimedia scene stored on said content proxy in response to an addition at said business server of additional profilable content predetermined for another predetermined profile of users having at least one common demographic parameter, including:

in response to the addition at said business server of said additional profilable content, receiving at least one additional instance of said at least one model of said profiled multimedia scene that is adapted to said other predetermined profile of users by integrating in said portion of said multimedia scene said additional profilable content, and storing, within said content proxy, said at least one additional instance of said at least one model of said profiled multimedia scene;

wherein initial data of the multimedia scene includes at least a plurality of different profilable contents and a plurality of different predetermined profiles of users each predetermined for at least one of said different profilable contents, such that a different instance of said at least one model of said profiled multimedia scene is received for each unique combination of predetermined profile of users and corresponding predetermined profilable content, such that for each unique combination said received instance of said at least one model of said profiled multimedia scene is adapted for said predetermined profile of users included in said combination and integrates said profilable content predetermined for said predetermined profile of users.

2. The method of claim 1, wherein said profilable content integrated in said portion of said multimedia scene is one of an advertisement and a promotion.

3. A system, comprising:
at least one hardware processor for:
prior to receiving a request from a user for a profiled multimedia scene, receiving from a business server at least one instance of at least one model of said profiled multimedia scene for avoiding retrieval of any portion of said multimedia scene from said business server in response to said request from said user;

determining a profile for said user, said at least one instance of said at least one model of said profiled multimedia scene adapted to a predetermined profile of users having at least one common demographic parameter by integrating in a portion of a multimedia scene profilable content predetermined for said predetermined profile of users having said at least one common demographic parameter, and said at least one instance of said at least one model of said profiled multimedia scene originating with said business server that pre-computes a different instance of said at least one model of said profiled multimedia scene for each different predetermined profile of users such that each instance of said at least one model of said profiled multimedia scene is adapted to a particular predetermined profile of users by integrating in said portion of said multimedia scene different profilable content predetermined for the particular predetermined profile of users;

obtaining, based on said profile, said at least one instance of said profiled multimedia scene model previously stored by a multimedia content proxy, where said obtaining comprises searching for an instance of a profiled multimedia scene model using a multidimensional data structure enabling at least one profiled multimedia scene model to be associated with at least one user profile parameter, including searching a plurality of instances of models that have been pre-computed, prior to receiving said request from said user, by said business server; and aggregating, within said at least one instance, at least one multimedia data item corresponding to at least one parameter of a request from a terminal of said user;

wherein said business server is separate from said content proxy;

wherein updating said content proxy in response to a client request is avoided by updating said at least one instance of said at least one model of said profiled multimedia scene stored on said content proxy in response to an addition at said business server of additional profilable content predetermined for another predetermined profile of users having at least one common demographic parameter, including:

in response to the addition at said business server of said additional profilable content, receiving at least one additional instance of said at least one model of said profiled multimedia scene that is adapted to said other predetermined profile of users by integrating in said portion of said multimedia scene said additional profilable content, and storing, within said content proxy, said at least one additional instance of said at least one model of said profiled multimedia scene;

wherein initial data of the multimedia scene includes at least a plurality of different profilable contents and a plurality of different predetermined profiles of users each predetermined for at least one of said different profilable contents, such that a different instance of said at least one model of said profiled multimedia scene is received for each unique combination of predetermined profile of users and corresponding predetermined profilable content, such that for each unique combination said received instance of said at least one model of said profiled multimedia scene is adapted for said predetermined profile of users included in said combination and integrates said profilable content predetermined for said predetermined profile of users.

4. A computer program product embodied on a non-transitory computer readable medium, comprising:
computer code for, prior to receiving a request from a user for a profiled multimedia scene, receiving from a business server at least one instance of at least one model of said profiled multimedia scene for avoiding retrieval of any portion of said multimedia scene from said business server in response to said request from said user;

computer code for determining a profile for said user, said at least one instance of said at least one model of said profiled multimedia scene adapted to a predetermined profile of users having at least one common demographic parameter by integrating in a portion of a multimedia scene profilable content predetermined for said predetermined profile of users having said at least one common demographic parameter, and said at least one instance of said at least one model of said profiled multimedia scene originating with said business server that pre-computes a different instance of said at least one model of said profiled multimedia scene for each different predetermined profile of users such that each instance of said at least one model of said profiled multimedia scene is adapted to a particular predetermined profile of users by integrating in said portion of said multimedia scene different profilable content predetermined for the particular predetermined profile of users;

computer code for obtaining, based on said profile, said at least one instance of said profiled multimedia scene model previously stored by a multimedia content proxy, where said obtaining comprises searching for an instance of a profiled multimedia scene model using a multidimensional data structure enabling at least one profiled multimedia scene model to be associated with at least one user profile parameter, including searching a plurality of instances of models that have been pre-computed, prior to receiving said request from said user, by said business server; and computer code for aggregating, within said at least one instance, at least one multimedia data item corresponding to at least one parameter of a request from a terminal of said user;

wherein said business server is separate from said content proxy;

wherein updating said content proxy in response to a client request is avoided by updating said at least one instance of said at least one model of said profiled multimedia scene stored on said content proxy in response to an addition at said business server of additional profilable content predetermined for another predetermined profile of users having at least one common demographic parameter, including:

in response to the addition at said business server of said additional profilable content, receiving at least one additional instance of said at least one model of said profiled multimedia scene that is adapted to said other predetermined profile of users by integrating in said portion of said multimedia scene said additional profilable content, and storing, within said content proxy, said at least one additional instance of said at least one model of said profiled multimedia scene;

wherein initial data of the multimedia scene includes at least a plurality of different profilable contents and a plurality of different predetermined profiles of users each predetermined for at least one of said different profilable contents, such that a different instance of said at least one model of said profiled multimedia scene is received for each unique combination of predetermined profile of users and corresponding predetermined profilable content, such that for each unique combination said received instance of said at least one model of said profiled multimedia scene is adapted for said predetermined profile of users included in said combination and integrates said profilable content predetermined for said predetermined profile of users.

* * * * *